United States Patent

Hadfield et al.

[11] Patent Number: 5,872,684
[45] Date of Patent: Feb. 16, 1999

[54] AIR BEARING SLIDER HAVING A RELIEVED TRAILING EDGE

[75] Inventors: Robert Glenn Hadfield; Cherngye Hwang; Andrew Chiuyan Ting, all of San Jose; Eric K. Wong, San Mateo; Tanya M. Zook, San Jose, all of Calif.

[73] Assignee: International Business Machines Corporation, Armonk, N.Y.

[21] Appl. No.: 857,111

[22] Filed: May 15, 1997

[51] Int. Cl.[6] ............................ G11B 17/32; G11B 5/187
[52] U.S. Cl. ........................................ 360/103; 360/122
[58] Field of Search .................................. 360/103, 126, 360/110, 122

[56] References Cited

U.S. PATENT DOCUMENTS

| | | | |
|---|---|---|---|
| 4,797,765 | 1/1989 | Ezaki et al. | 360/110 |
| 5,079,831 | 1/1992 | Reid | 29/603 |
| 5,116,719 | 5/1992 | Gau | 430/313 |
| 5,331,497 | 7/1994 | Fuchigami | 360/126 |
| 5,508,863 | 4/1996 | Goto et al. | 360/104 |
| 5,578,342 | 11/1996 | Tran et al. | 427/131 |
| 5,580,602 | 12/1996 | McKean et al. | 427/127 |
| 5,659,451 | 8/1997 | Cohen et al. | 360/126 |

*Primary Examiner*—John H. Wolff
*Attorney, Agent, or Firm*—Merchant, Gould, Smith, Edell, Welter & Schmidt, P.A.

[57] ABSTRACT

The present invention discloses a slider having an alumina overcoat layer that is etched so as to be tapered, sloped, inclined, recessed, or faceted with respect to the air-bearing surfaces of the slider. The present invention also relates to a method for eliminating overcoat protrusions by etching away portions of the alumina overcoat layer at row level. Preferably, photolithographic techniques are used at row level to both etch the air-bearing surfaces of the slider and to etch away potential protrusion regions of the alumina overcoat.

5 Claims, 5 Drawing Sheets

Deposited End View

AIR BEARING SLIDER HAVING A RELIEVED TRAILING EDGE

BACKGROUND OF THE INVENTION

1. Field of the Invention

This invention relates in general to air bearing sliders having magnetic heads for use with disk drives and methods for manufacturing. More particularly, the present invention relates to air bearing sliders having thin-film magnetic heads for use with disk drives and methods for manufacturing such sliders.

2. Description of Related Art

Direct access storage devices (DASD), or disk drives, store information on concentric tracks of a rotatable magnetic recording disk. A slider having a transducer or magnetic head is moved from track to track to record and read the desired information. The slider includes air-bearing surfaces configured for causing the magnetic head to fly a desired distance above the surface of the disk as the disk rotates. The magnetic head performs write or read functions and is positioned at the trailing end of the slider. Exemplary magnetic heads include first and second magnetic pole pieces separated by a non-magnetic gap layer. Generally, a coil is positioned within the non-magnetic gap layer and an overcoat layer of alumina covers the second pole piece. The overcoat layer of alumina is generally located directly at the trailing edge of the slider.

A problem with magnetic heads is that when the coil is subjected to write currents, the overcoat of alumina grows, protrudes, or expands due to localized heating. This growth or expansion causes a portion of the overcoat to protrude beyond the air-bearing surface of the slider. Such a protrusion is problematic because it interferes with slider/disk contact.

There currently is a need for an efficient method for eliminating the above-described overcoat protrusion problem. The present invention addresses this need as well as other needs.

SUMMARY OF THE INVENTION

To overcome the limitations in the prior art described above, and to overcome other limitations that will become apparent upon reading and understanding the present specification, the present invention discloses an air bearing slider having an alumina overcoat layer that is etched so as to be tapered, sloped, inclined, recessed, or faceted with respect to the air-bearing surfaces of the slider. The present invention also relates to a method for eliminating overcoat protrusions by etching away portions of the alumina overcoat layer at row level. Preferably, photolithographic techniques are used at row level to both etch the air-bearing surfaces of the slider and to etch away the potential protrusion regions of the alumina overcoat.

Other embodiments of a system in accordance with the principles of the invention may include alternative or optional additional aspects. One such aspect of the present invention relates to a slider having a leading end, a trailing end, and an air-bearing surface. The slider also includes a magnetic head located at the trailing end of the slider. The magnetic head includes a first magnetic pole member having a first pole tip, a non-magnetic gap layer deposited over the first pole member, a polymeric insulator deposited over the non-magnetic gap layer, a coil positioned within the polymeric insulator, and a second magnetic pole member deposited over the polymeric insulator and having a second pole tip. An overcoat layer covers the magnetic head and defines the trailing end of the slider. The overcoat layer has an etched portion that extends between the second pole tip and the trailing end of the slider. The second pole tip is not included within the etched portion. The etched portion is sloped with respect to the air-bearing surface of the slider and is arranged and configured for preventing the overcoat layer from protruding past the air-bearing surface upon expansion of the overcoat layer during operation of the magnetic head.

Another aspect of the present invention relates to a disk drive system incorporating the above-described slider, The system includes a suspension that connects the slider to an actuator arm. The actuator arm moves the slider in a radial direction across a disk. The disk is rotated by a spindle motor. A control unit provides overall control to the system.

An additional aspect of the present invention relates to a method for eliminating overcoat protrusions on a slider. The method includes the step of patterning an air-bearing side of the slider with a photo-resist mask such that a covered region and an exposed region are generated. The covered region corresponds with desired air-bearing surfaces of the slider. The exposed region includes a protrusion region of overcoat which is located between a transducer and a trailing edge of the slider. The method further includes the step of forming the air-bearing surfaces of the slider by etching away the exposed region relative to the covered region. Exemplary etching techniques include reactive ion etching and ion milling. During the etching process, the protrusion region is etched a sufficient distance below the air-bearing surfaces such that when the overcoat expands during use of the transducer, the protrusion region will not protrude beyond the air-bearing surfaces.

Still another aspect of the present invention relates to a method for manufacturing sliders. The sliders include leading edges and trailing edges. The sliders also include thin-film magnetic heads having first and second pole pieces that form first and second pole tips. Overcoat layers cover the magnetic heads and are located directly at the trailing edges of the sliders. The method includes the steps of forming the sliders on a substrate and dicing the substrate into rows of sliders. The method also includes the step of patterning the rows of sliders with photo-resist masks configured to leave protrusion regions of the sliders exposed. The protrusion regions are located at the overcoat layers between the magnetic heads and the trailing edges of the sliders. The method further includes the step of etching the patterned sliders to generate raised air-bearing surfaces that correspond to the photo-resist mask pattern, and to recess the protrusion regions relative to the air-bearing surfaces. The protrusion regions are etched a sufficient distance below the air-bearing surfaces such that when the overcoat layers expand during use of the magnetic heads, the protrusion regions will not protrude beyond the air-bearing surfaces. Finally, the rows of etched sliders are diced into separate, discrete sliders.

A further aspect of the present invention relates to a method for eliminating overcoat protrusions on a slider. The slider includes an air-bearing side, a leading edge, and a trailing edge. The slider also includes a magnetic head having a first pole tip and a second pole tip. An overcoat layer covers the magnetic head at the trailing edge of the slider. The method includes the step of forming a photo-resist mask on the air-bearing side of the slider. The photo-resist mask has a pattern that corresponds to a desired air-bearing surface pattern. The photo-resist mask also has a trailing end that terminates at the second pole tip such that the second pole tip is covered, but the overcoat layer is exposed. The method also includes the step of etching away exposed portions of the air-bearing side of the magnetic head such that the desired air-bearing surface pattern is formed on the air-bearing side of the magnetic head, and the overcoat layer along the air-bearing side of the magnetic head is etched a sufficient distance below the air-bearing surface pattern to prevent the overcoat layer from interfering with the operation of the magnetic head upon expansion of the overcoat layer.

A variety of additional advantages of the invention will be set forth in part in the description which follows, and in part will be obvious from the description, or may be learned by practice of the invention. The advantages of the invention will be realized and attained by means of the elements and combinations particularly pointed out in the claims. It is to be understood that both the foregoing general description and the following detailed description are exemplary and explanatory only arid are not restrictive of the invention as claimed.

BRIEF DESCRIPTION OF THE DRAWING

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration a specific embodiment in which the invention may be practiced. It is to be understood that other embodiments may be utilized as structural changes may be made without departing from the scope of the present invention.

Figure 1:
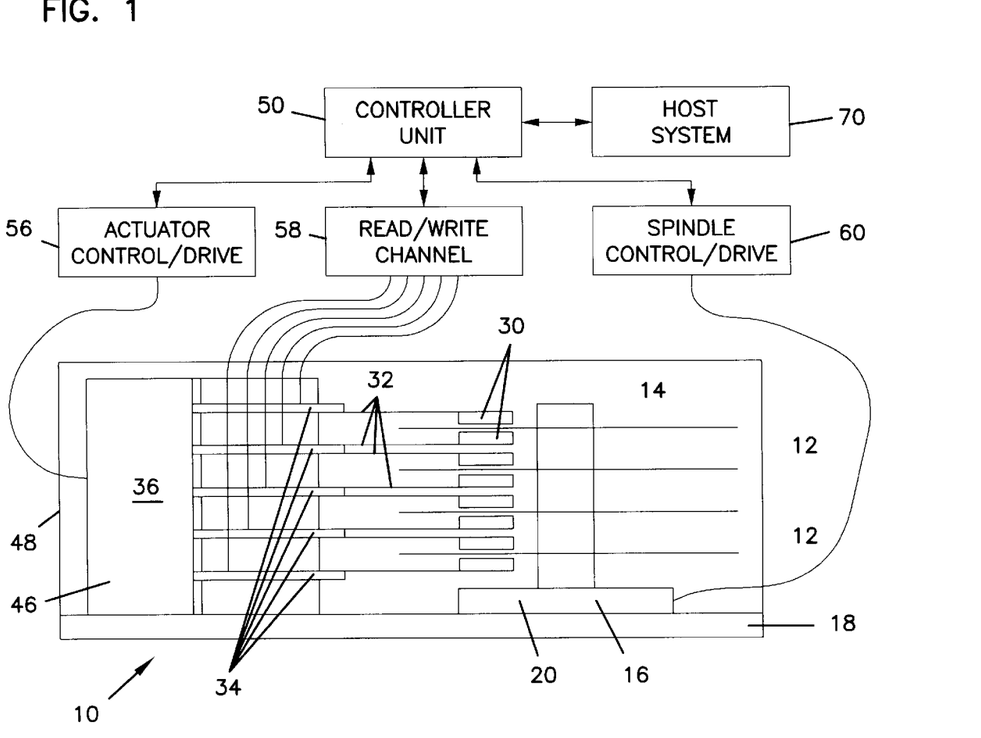
FIG. 1 is a schematic diagram of a data storage system.

FIG. 1 shows a schematic diagram of a data storage system of the present invention that is designated by the general reference number 10. System 10 comprises a plurality of magnetic recording disks 12. Each disk has a plurality of concentric data tracks. Disks 12 are mounted on a spindle motor shaft 14 which is connected to a spindle motor 16, Motor 16 is mounted to a chassis 18. The disks 12, spindle 14, and motor 16 comprise a disk stack assembly 20.

A plurality of sliders 30 having read/write heads are positioned over the disks 12 such that each surface of the disks 12 has a corresponding slider 30. Each slider 30 is attached to one of the plurality of suspensions 32 which in turn are attached to a plurality of actuator arms 34. Arms 34 are connected to a rotary actuator 36. Alternatively, the arms 34 may be an integral part of a rotary actuator comb. Actuator 36 moves the heads in a radial direction across disks 12. Actuator 36 typically comprises a rotating member 3a mounted to a rotating bearing 40, a motor winding 42 and motor magnets 44. Actuator 36 is also mounted to chassis 18. Although a rotary actuator is shown in the preferred embodiment, a linear actuator could also be used. The sliders 30, suspensions 32, arms 34, and actuator 36 comprise an actuator assembly 46. The disk stack assembly 20 and the actuator assembly 46 are sealed in an enclosure 48 (shown by dashed line) which provides protection from particulate contamination.

A controller unit 50 provides overall control to system 10. Controller unit 50 typically contains a central a processing unit (CPU), memory unit and other digital circuitry. Controller 50 is connected to an actuator control/drive unit 56 which in turn is connected to actuator 36. This allows controller 50 to controller 50 to control the movement of sliders 30 over disks 12. The controller 50 is a connected. to a read/write channel 56 which in turn is connected to the heads of the sliders 30. This allows controller 50 to send and receive data from the disks 12. Controller 50 is connected to a spindle control/drive unit 60 which in turn is connected to spindle motor 16. This allows controller 50 to control the rotation of disks 12. A host system 70, which is typically a computer system, is connected to the controller unit 50. System 70 may send digital data to controller 50 to be stored disks 12, or may request that digital data be read from disks 12 and Bent to the system 70. The basic operation of DASD units is well known in the art and is described in more detail in *Magnetic Recording Handbook*, C. Dennis Mee and Eric D. Daniel, McGraw Hill Book Company, 1990.

Figure 2:
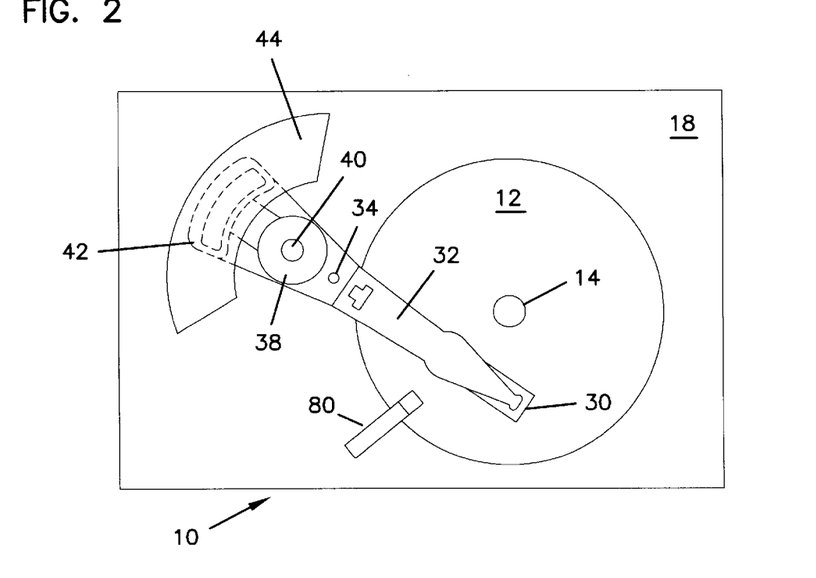
FIG. 2 is a top view of the system of FIG. 1.
Figure 3:
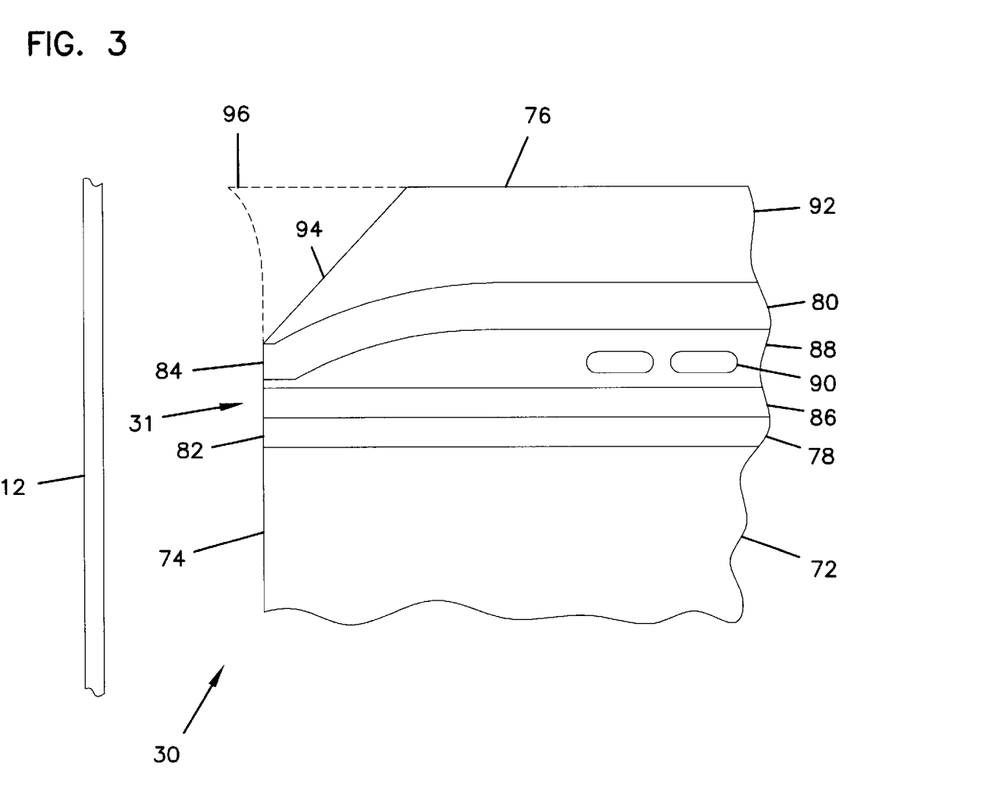
FIG. 3 is a cross-sectional view of the trailing end of a slider constructed in accordance with the principles of the present invention.

FIG. 2 shows top view of system 10. A loading ramp member 80 is located at the edge of the disk stack assembly 20. Member 80 automatically unloads the sliders 30 from the disks 12 as actuator 36 moves the sliders 30 to the outer disk position. To unload a slider or head means to move it a vertical distance away from its corresponding disk surface. The ramp 80 is optional. Alternatively, the sliders 30 may be placed permanently in the loaded position between the disks FIG. 3 is a cross-sectional view of the trailing end of one of the sliders 30. As shown in the cross-sectional view, the slider 30 includes a non-magnetic substrate 72 typically made of a ceramic material. The substrate 72 forms a majority of the body of the slider and defines of an air-bearing surface 74 having an aerodynamic configuration suitable for lifting the slider 30 above its corresponding disk 12. The slider includes a magnetic head 31 or transducer having first and second spaced-apart magnetic pole pieces 78 and 80 which are located adjacent to a trailing end 76 of the slider 30. The pole pieces 78 and 80 include first and second pole tips 82 and 84 that are aligned with the air-bearing surface 74. A non-magnetic gap layer 86 is located between the first and second pole pieces 78 and 80. Additionally, an insulating layer 68 is positioned between the non-magnetic layer 86 and the second magnetic pole piece 80. Preferably, the insulating layer 88 is made of a polymeric material such as hard-baked photo-resist. A coil 90 is located within the insulating layer 88. Finally, an overcoat layer 92 covers the magnetic head 31 and forms the trailing edge 76 of the slider 30. Preferably, the overcoat layer comprises $Al_2O_3$.

During the write operations of the magnetic head 31, localized heating causes the polymeric layer 8s to expand, which in turn causes the overcoat layer 92 to expand. In prior art heads, such expansion results in a protrusion region 96 (shown in phantom line in FIG. 3) that protrudes past the air-bearing surface of the slider and that interferes with the effective operation of the head. To eliminate this protrusion problem, the overcoat layer 92 of the present slider 30 has been cut, etched, or recessed with respect to the air-bearing surface 74. Specifically, the overcoat layer 92 includes an etched portion 94 that is sloped with respect to the air-bearing surface 74 and that is configured for preventing the overcoat layer 92 from protruding past the air-bearing surface 74 upon expansion of the overcoat layer 92.

Preferably, the overcoat layer 92 has a thickness in the range of 20–50 microns. Also preferably, the etched portion 94 does not include the second pole tip 84. Consequently, the etched portion 94 has a leading edge that trails the second pole tip 84 and a trailing edge that coincides with the trailing edge 76 of the slider 30. Preferably, the etched portion 94 begins within 1–5 microns of the second pole tip 84. The etched portion 94 may be curved or flat. What is significant is that the etched portion 94 is etched a sufficient depth to prevent the overcoat layer from protruding past the air-bearing surface 74 of the slider 30 upon expansion.

Figure 4:
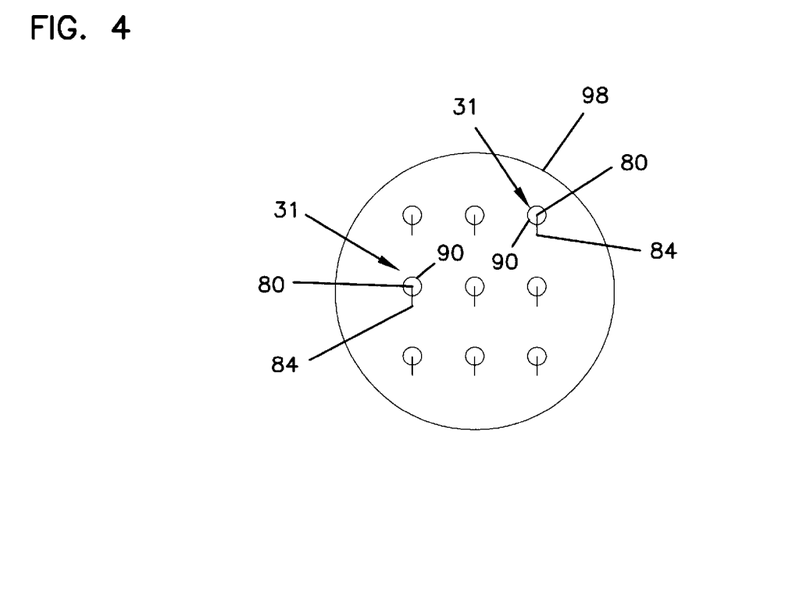
FIG. 4 is a top view of a wafer having a plurality of thin-film magnetic heads deposited thereon.

FIGS. 4-8 illustrate various steps of a method for manufacturing the above-described slider 30. FIG. 4 is a top view of a ceramic wafer 98 which forms the substrate 72 of the slider 30. Preferably, the wafer 98 is used to manufacture a plurality of sliders 30. The various layers of each slider 30, such as the first magnetic pole piece 78, the gap layer 86, the insulating layer 88, the coil 90, the second pole piece 84, and the overcoat layer 92, are built up layer by layer upon the wafer 98 using deposition processes similar to the semiconductor industry. Exemplary processes include vacuum evaporation, sputtering, lift-off, wet chemical etching, and photolithographic techniques. An exemplary technique for generating the layers of a slider having a thin-film magnetic head is described in U.S. Pat. No. 4,652,954, which is hereby incorporated by reference.

In the top view of FIG. 4, the deposited ends of the sliders 30 are shown. Specifically, the magnetic coils 90, the second poles 80, and the second pole tips 84 of each head 31, are shown.

Figure 5:
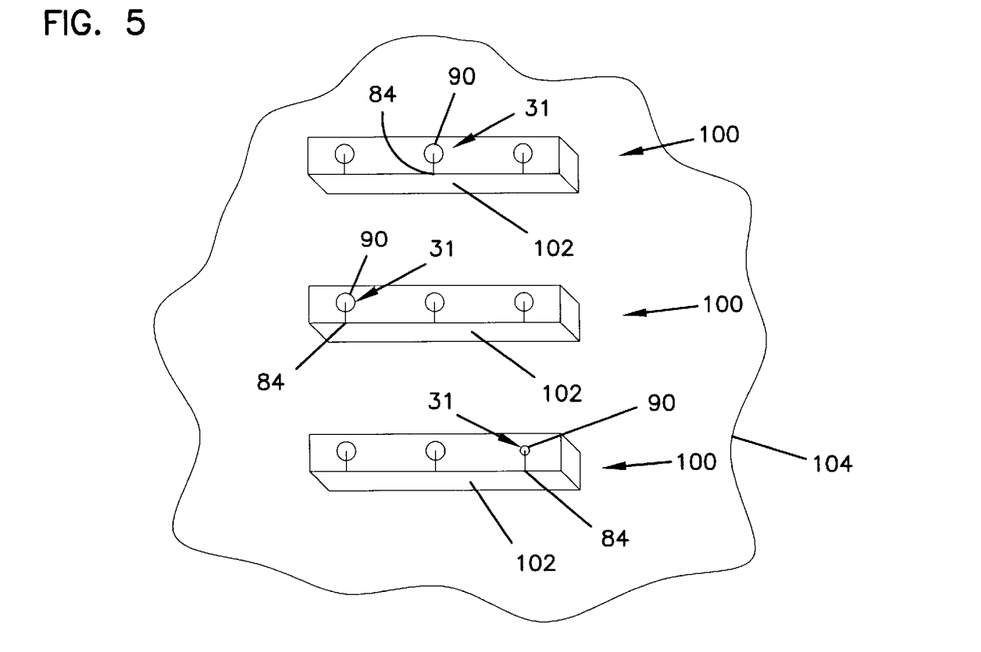
FIG. 5 illustrates the wafer of FIG. 4 diced into rows of magnetic heads.

After the layers have been deposited on the wafer 98, the wafer 98 is sliced into quadrants and then cut into rows 100, as shown in FIG. 5. surfaces 102 of the rows 100 are then polished using advanced lapping techniques and slurries. It will be appreciated that the polished surfaces 102 of the rows 100 correspond with the air-bearing surfaces 74 of the sliders 30. After the rows 100 have been polished, the rows 100 are mounted on a carrier 104 so that multiple rows can be processed at one time.

Figure 6:
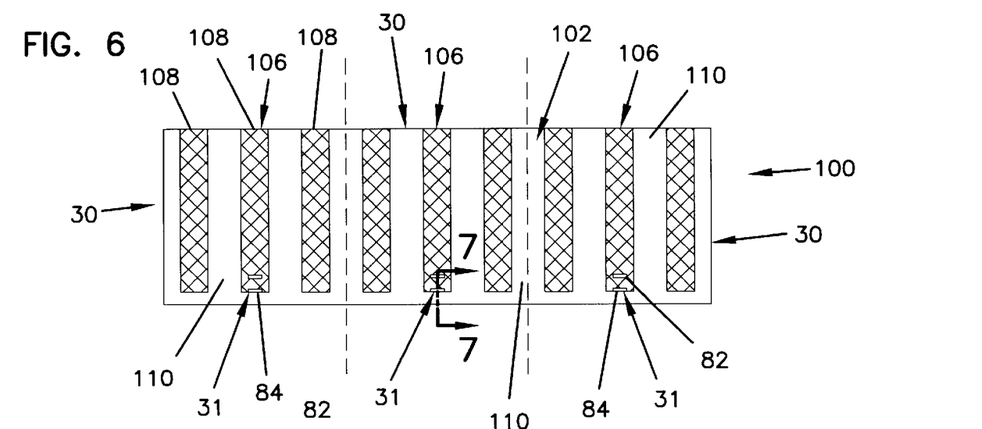
FIG. 6 illustrates one of the rows of FIG. 5 having a photo-resist mask patterned thereon.

Once the rows 100 are mounted on the carrier 104, the polished surfaces 102 are covered with photo-resist, which is patterned by exposure and development. FIG. 6 shows a single row 100, which includes three magnetic heads 31. The polished surface 102 of the row of heads has been coated with photo-resist pattern masks 106. The photo-resist pattern masks 106 correspond with a desired air-bearing surface configuration having aerodynamic characteristics suitable for causing the heads 31 to fly a desired level above the disks 12.

To generate the photo-resist masks 106, the polished surfaces 102 are first coated with photo-resist. Next, a masking tool having a predetermined pattern is aligned relative to the rows 100 of heads 31. Light is then directed through the masking tool so that selected portions of the photo-resist on the polished surfaces 102 are exposed. Alignment of the masking tool is achieved by using a stepper with row-bar alignment or a well-aligned contact/projected aligner. After the selected regions of the polished surfaces 102 have been exposed, the photo-resist is developed such that the desired air-bearing surface configurations are left covered with the photo-resist masks 106, while the remainder of the photo-resist is removed.

Figure 7:
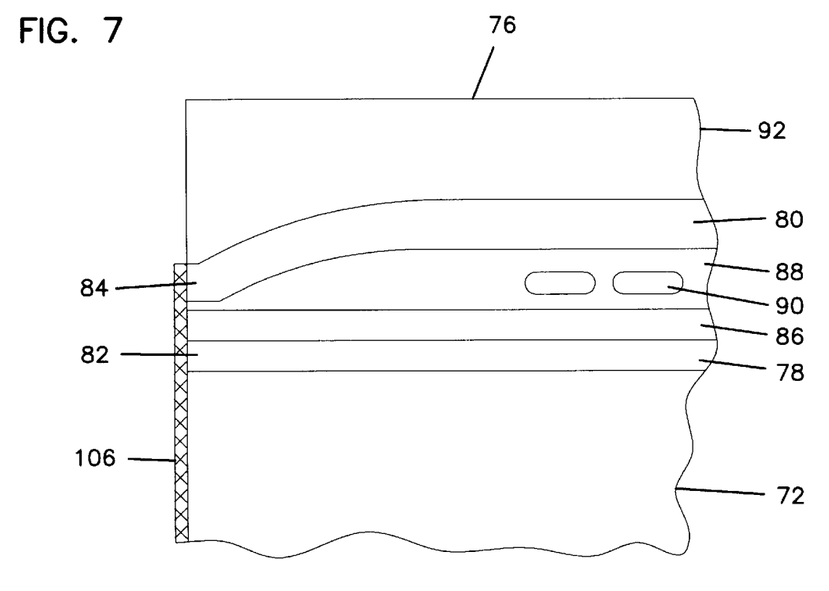
FIG. 7 is a cross-sectional view taken along section line 7—7 of FIG. 6.

As shown in FIG. 6, the photo-resist masks 106 are configured to cover three air-bearing rails 109 that extend lengthwise along each slider 30. As shown in FIG. 7, the photo-resist masks 106 preferably terminate at the second pole tips 84 such that the overcoat layers 92 of alumina are not cover by the photo-resist masks 106. The stepper with row-bar alignment or the well-aligned contact/projected aligner preferably are able to align the masking tool within 1 micron of the second pole tips 84. Consequently, the photo-resist masks 106 preferably completely cover the second pole tips 84 and terminate within 1–5 microns of the second pole tips 84 The limit on the distance between the photo-resist mask edge and the second pole tips 84 is the alignment tolerant. Preferably, the second pole tips 84 will never be exposed during etching.

Once the rows of sliders 30 have been masked with the desired pattern of photo-resist, through exposure and development, the polished surfaces 102 are etched by etching techniques such as ion milling or reactive ion etching. Such etching techniques etch away the exposed surfaces 102 to a desired depth, Consequently, in the embodiment shown in FIG. 6, exposed regions 110 are etched away relative to the covered or patterned regions 106. Through etching, the desired air-bearing surface patterns are formed on the air-bearing sides of the sliders 30. Specifically, with respect to the embodiment of FIG. 6, the three rails 108 defining desired air-bearing surfaces are formed on the air-bearing side of each slider 30.

Because the photo-resist masks 106 have trailing edges that terminate at the second pole tip 84 of each head, the overcoat layer 92 is exposed at the trailing end of each slider 30. Therefore, when the air-bearing side of each magnetic head is etched, the overcoat layer 92 is etched away relative to the air-bearing surfaces of the rails 108. In this manner, portions of the overcoat layer 92 that would be subject to protrusion, or the protrusion regions, are etched away at row level at the same time the desired air-bearing surface pattern is etched into the air-bearing side of each slider 30. Manufacturing efficiency is maximized by concurrently etching the air-bearing surfaces and removing the projection regions in a single phase.

Prior to etching, as shown in FIG. 7, the overcoat layer 92 is substantially flush or coplanar with the air-bearing surface 74 of the slider 30. As previously described, this is problematic because during write operations, localized heat from the magnetic coil 90 causes expansion of the overcoat layer 92, which causes the protrusion region 96 (shown in FIG. 3) to project beyond the air-bearing surface 74 of the magnetic head 30. Consequently, it is desirable to recess the overcoat layer 92 in the region between the second pole tip 84 and the trailing end of the slider 30.

Figure 8:
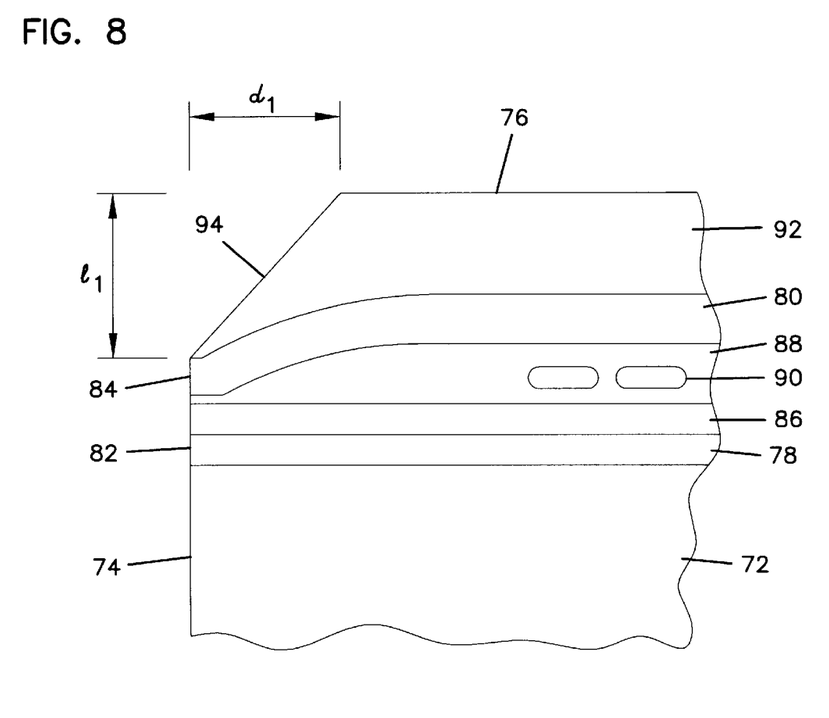
FIG. 8 is a cross-sectional view of the trailing end of one of the magnetic heads of FIGS. 4–7 after etching of the exposed regions and stripping away of the photo-resist mask.

After the rows 100 of sliders 30 have been etched, the remaining photo-resist mask 106 is stripped away and the rows 100 are diced into individual sliders 30. FIG. 8 shows the trailing end of one of the sliders 30 after the photo-resist mask 106 has been stripped away. As shown in FIG. 8, the overcoat layer 92 has been etched relative to the air-bearing surfaces 74 of the slider 30. The etched portion 94 of the overcoat layer 92 forms an oblique angle with respect to the air-bearing surface 74. The intersection between the etched portion 94 and the air-bearing surface 74 is preferably as close to the second pole tip 84 as possible without etching the second pole tip 84 itself. The closeness of the etched portion to the second pole tip 84 is dependent upon the tolerance level of the alignment scheme used to generate the pattern mask 106.

Referring back to FIG. 8, the etched portion 94 has a length $l_1$ generally in the range of 20–50 microns. Additionally, the etched portion 94 has a depth $d_1$ generally in the range of 0.1–10 microns. The depth. $d_1$ of the etch is limited by the location of the second pole piece 80 within the slider. During etching of the overcoat layer 92, it is desired not to etch away any of the second magnetic pole piece 80. Consequently, the range of depth of the etched portion 94 is dependent upon the write head profile and throat height of the head 31.

Figure 9:
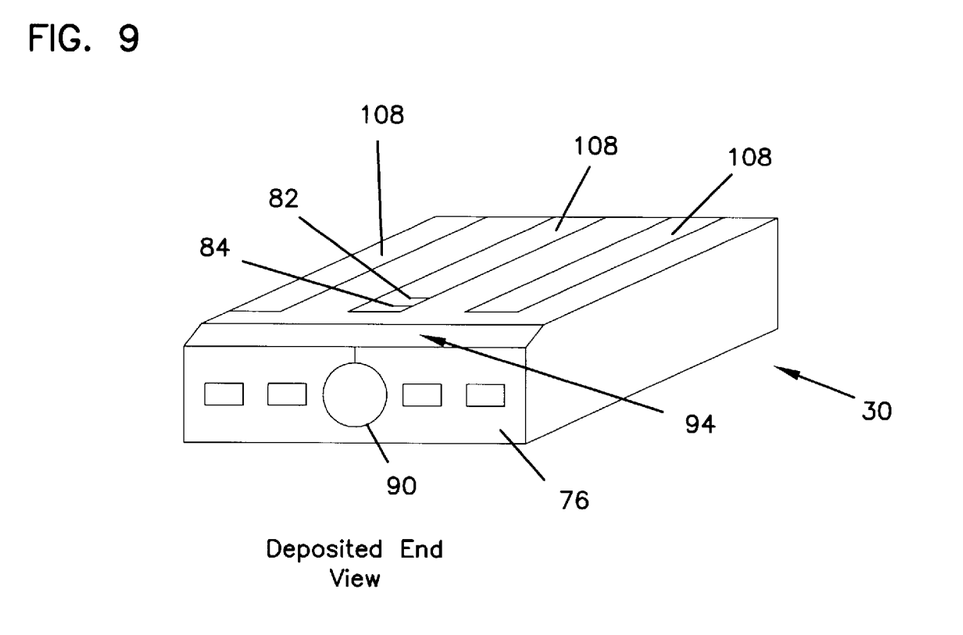
FIG. 9 is a deposited end perspective view of a slider constructed in accordance with the principles of the present invention.

FIG. 9 shows a perspective view of the slider 30 generated by the above-described process. For the purpose of illustration, the magnitude of the etched portion is greatly exaggerated. Although a three railed configuration is specifically shown, it will be appreciated that the present invention applies to various types of other slider configurations. For example, the invention also applies to negative pressure sliders and other types of sliders.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A slider comprising:
    a slider body including a leading end, a trailing end, and an air bearing surface;
    a magnetic head located at the trailing end of the slider body, the magnetic head including a first magnetic pole member having a first pole tip, a non-magnetic gap layer deposited on the first pole member, a polymeric insulator deposited on the non-magnetic gap layer, a coil positioned within the polymeric insulator, and a second magnetic pole member deposited on the polymeric insulator and having a second pole tip located at a position that trails the first pole tip; and
    an overcoat layer covering the magnetic head at the trailing end of the slider body, the overcoat layer having an etched-away portion that begins at a location that trails the second pole tip such that the second pole tip is not etched, the etched-away portion being sloped with respect to the air bearing surface of the slider and being arranged and configured for preventing the overcoat layer from protruding past the air bearing surface upon expansion of the overcoat layer during operation of the magnetic head.

2. The slider of claim 1, wherein the location at which the etched-away portion begins is within 5 microns of the second pole tip.

3. The slider of claim 1, wherein the etched-away portion has an etch depth in the range of 0.1–10 microns.

4. The slider of claim 1, wherein the polymeric insulator comprises hard-baked photo-resist, and the overcoat layer comprises alumina.

5. A data storage device comprising:
    a storage medium including a plurality of tracks;
    a slider body including a leading end, a trailing end, and an air bearing surface;
    a magnetic head located at the trailing end of the slider body, the magnetic head including a first magnetic pole member having a first pole tip, a non-magnetic gap layer deposited on the first pole member, a polymeric insulator deposited on the non-magnetic gap layer, a coil positioned within the polymeric insulator, and a second magnetic pole member deposited on the polymeric insulator and having a second pole tip located at a position that trails the first pole tip;
    an overcoat layer covering the magnetic head at the trailing end of the slider body, the overcoat layer having an etched-away portion that begins at a location that trails the second pole tip such that the second pole tip is not etched, the etched-away portion being sloped with respect to the air bearing surface of the slider and being arranged and configured for preventing the overcoat layer from protruding past the air bearing surface upon expansion of the overcoat layer during operation of the magnetic head;
    a motor coupled to the storage medium for moving the storage medium relative to the slider body; and
    an actuator assembly connected to the slider body for moving the slider body relative to the storage medium.

* * * * *

UNITED STATES PATENT AND TRADEMARK OFFICE
CERTIFICATE OF CORRECTION

PATENT NO. : 5,872,684  
DATED : February 16, 1999  
INVENTOR(S) : Hadfield et al.

It is certified that error appears in the above-identified patent and that said Letters Patent is hereby corrected as shown below:

Column 4,  
Line 8, please replace "3a" with -- 38 --;  
Line 23, please replace "56" with -- 58 --;  
Line 32, please replace "Bent" with -- sent --;  
Line 58, please replace "68" with -- 88 --;  
Line 67, please replace "8s" with -- 88 --.

Signed and Sealed this

Third Day of September, 2002

*Attest:*

JAMES E. ROGAN  
*Attesting Officer*     *Director of the United States Patent and Trademark Office*